July 31, 1956 A. D. BEARD 2,757,280
SIGNAL RESPONSIVE CIRCUIT
Filed Nov. 28, 1952
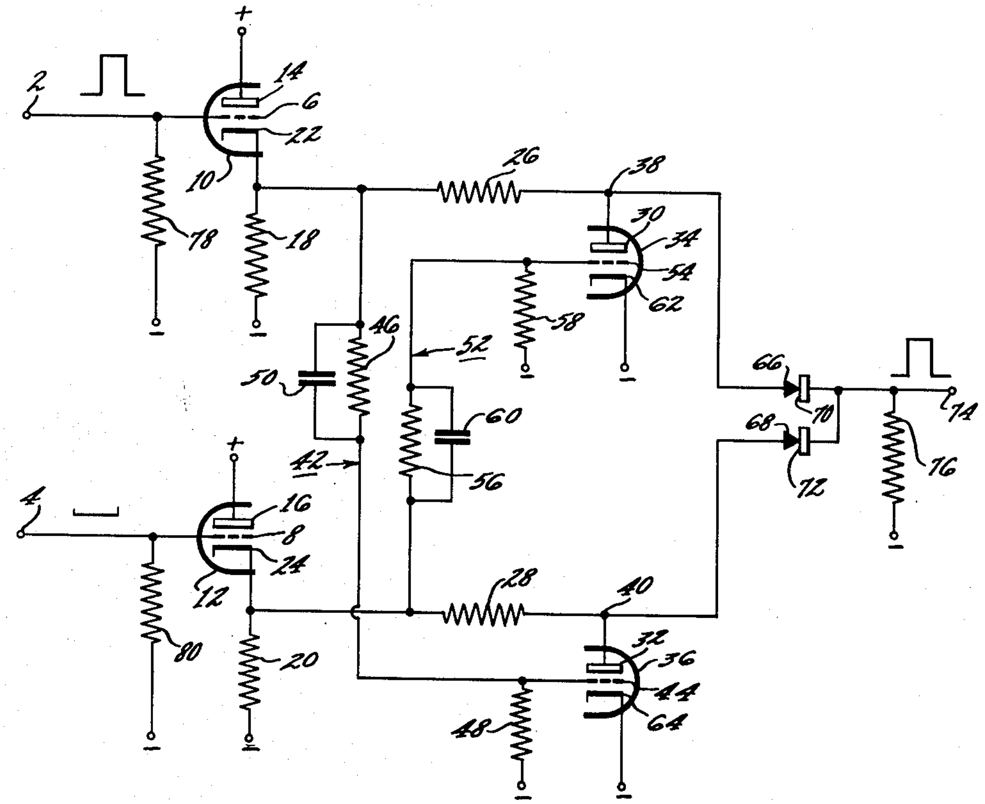
INVENTOR.
Arthur D. Beard
BY Morris A. Rabkin
ATTORNEY 2,757,280
Patented July 31, 1956

2,757,280

SIGNAL RESPONSIVE CIRCUIT

Arthur D. Beard, Haddonfield, N. J., assignor to Radio Corporation of America, a corporation of Delaware Application November 28, 1952, Serial No. 323,040

10 Claims. (Cl. 250—27)

This invention relates to information handling devices and computers; and particularly to an electronic signal responsive circuit having utility therein.

Gating and buffer circuits used in the digital computer art have been given a nomenclature which relates to the logical function performed by the circuit. A gate is sometimes called a coincidence or logical 'and" circuit. Such a circuit may have a first and second input and an output. An output pulse is produced only if the first and second inputs are pulsed simultaneously. A buffer is called a logical "or" circuit, since an output pulse is produced if either one or the other of two inputs or both are pulsed. Circuits of this general type are described in a book entitled "High-Speed Computing Devices" by Engineering Research Associates, McGraw-Hill, 1950, Chapter 4. One form of logical circuit is that in which the function "either but not both" is produced; that is to say, an output pulse is produced if a signal pulse is applied to either one or the other of two inputs but not if a pulse is applied to both inputs simultaneously. This is sometimes called an anti-coincidence circuit. This type of circuit is of generally utility in the digital computer art as a switching circuit. It may also be used to determine if two bits or binary digits of binary information are represented by an odd or even number of pulses; and a plurality of such circuits may be combined to perform a parity check. The utilization of an "either but not both" circuit for a parity check is described in U. S. Patent No. 2,596,199. A further use of this type of logical circuit is in a binary adder as described in "High-Speed Computing Devices", cited above, Chapter 13.

Some of the prior art circuits that perform the logic of "either but not both" have the disadvantage of being uneconomical because of a relatively large number of circuit components being required. For example, the output signals may not be of the same polarity as the input signals, and extra components are needed to invert the output signal. In some prior art circuits there is a loss of signal strength, and an amplification stage is needed. In others, the utility and reliability of the circuit is limited by complexity of circuit design or aging of electron tubes.

Accordingly, it is an object of this invention to provide a new and improved signals responsive circuit of the type producing an output signal when a signal is present at either of two inputs but not present at both simultaneously.

Another object of this invention is to provide a simple signal responsive circuit which is economical and reliable.

Still another object of this invention is to provide a simple electronic circuit having two inputs, that translates signals received by either input and that neutralizes signals received simultaneously by both inputs.

These and other objects of this invention are achieved with a circuit utilizing a first and a second cathode follower which receive input signals. The cathodes of the first and second cathode follower are respectively connected through separate load resistors to the anodes of first and second inhibiting tubes, and also to first and second output terminals. These cathodes are also respectively cross-connected through separate voltage divider networks to the control grids of the second and first inhibiting tubes. The inhibiting tubes are normally biased to cutoff. A buffer circuit connects the first and second output terminals to a common output terminal.

If cathode follower receives a positive input pulse, the voltage at its cathode rises producing a positive output pulse at the output terminal connected thereto, which pulse is passed by the buffer circuit to the common output terminal. However, if both cathode followers receive positive input pulses simultaneously, the resulting rise in cathode voltage produces a voltage rise at the grids of both inhibiting tubes such that they both conduct. The anode currents of the inhibiting tubes are drawn through the load resistors from the cathode followers. Thus, the anodes of both inhibiting tubes, as well as the first and second output terminals connected thereto, remain at low potential. Accordingly, the common output terminal is not pulsed. Since a positive pulse is produced at the common output terminal if either of the cathode followers receives a positive input pulse, but not if both receive pulses, the logic of "either but not both" is provided.

The novel features of this invention as well as the invention itself both as to its organization and method of operation may be best understood from the following description and the accompanying drawing in which there is shown a schematic circuit diagram of an embodiment of the invention.

Referring to the drawing, a circuit embodying this invention includes a first and second input terminal 2 and 4 respectively connected to the control grids 6, 8 of first and second cathode followers 10 and 12. A positive source of operating potential is applied to the anodes 14, 16 of the cathode followers and the cathode resistors 18, 20 are connected to a negative potential level. The cathodes 22, 24 of the cathode followers are respectively connected through separate load resistors 26, 28 to the anodes 30, 32 of first and second inhibiting electron tubes 34, 36 as well as to first and second output terminals 38, 40. The cathode 22 of the first cathode follower 10 is connected through a first voltage divider 42 to the control grid 44 of the second inhibiting tube 36. The voltage divider 42 is made up of a first and second resistor 46 and 48 with a by-pass capacitor 50 across the first resistor 44. The second voltage divider resistor 48 functions as a grid resistor, and a negative biasing potential is applied to that resistor. The second cathode follower 12 is connected in the same manner through a second voltage divider 52 to the control grid 54 of the first inhibiting tube 34. This voltage divider 52 is also made up of a first resistor 56 and a second or grid resistor 58, with a by-pass capacitor 60 across the first resistor 56. The cathodes 62, 64 of the inhibiting tubes 34, 36 are connected to negative potential levels. The first and second output terminals 38, 40 are connected to the anodes 66, 68 of first and second diodes 70, 72. The cathodes of the diodes are both connected to an output terminal 74 as well as to a load resistor 76 which has a negative potential applied thereto. The input terminals 2, 4 may be connected to any suitable type of storage device such as trigger circuits (not shown) which have their outputs normally at low potential. Whatever is used to drive the input terminals, a negative potential is applied to the cathode follower control grids 6, 8. This may be done through separate grid resistors 78, 80, as shown.

When the circuit is in standby condition, the input terminals 2, 4 are maintained at a low potential level by the negative bias, and the cathodes 22, 24 of the cathode followers 10, 12 which follow the grids 6, 8 are likewise at low potential. The voltage divider resistors and the potentials across them are chosen so that the grids 44, 54 of the inhibiting tubes 34, 36 are normally negative with the respect to their cathodes 62, 64 and the tubes are cut off. A relatively high potential signal represents the binary digit "1," and will be considered a positive pulse. A low potential signal represents the binary digit "0," and takes the form of the absence of a pulse.

When a positive pulse is applied to the first input terminal 2 raising the voltage at the grid 6 of the first cathode follower 10, the cathode 22 of that tube also rises following closely the grid potential. Thus, the first output terminal 38, which is directly connected to that cathode 22 also rises. The rise in potential at the cathode 22 of the first cathode follower 10 results in the application of a voltage rise through the first voltage divider network 42 to the control grid 44 of the second inhibiting tube 36. The anode 32 of that tube 36, however, is already low, so that there is no significant change in potential at the anode, and at the second output terminal 40 connected thereto. In a similar manner, a positive input pulse at the grid 8 of the second cathode follower 12 results in a positive pulse at the second output terminal 40, and there is no significant change at the first output terminal 38. However, if both cathode followers 10, 12 receive positive input pulses, the voltage rise that takes place at the cathodes 22, 24 results in a voltage rise at the grids 44, 54 of both of the inhibiting tubes 34, 36 and they both conduct. The first inhibiting tube 34 draws plate current through the load resistor 26 connected to its anode 30. As a result of the voltage drop across the load resistor 26, the anode 30 and the first output terminal 38 connected thereto are maintained at low potential. Thus, the voltage rise at the first output terminal 38, which occurs when only the first cathode follower 10 receives an input pulse, is inhibited by an input simultaneously applied to the second cathode follower 12. The second cathode follower drives the first inhibiting tube to conduction, to maintain the first output terminal at low potential. Correspondingly, the second inhibiting tube 36 is driven to conduction by the first cathode follower 10 and its draws current through its load resistor 28. Therefore, the anode of the second inhibiting tube 36 remains at low potential, as does the second output terminal 40 connected thereto. Thus, when positive pulses are applied to both input terminals simultaneosuly, the first and second output terminals 38, 40 remain substantially unchanged at low potential.

The first and second output terminals 38, 40 are connected to a common output terminal 74 through the buffer circuit made up of the diodes 70, 72 and load resistor 76. The common output terminal 74 remains at the low potential applied to the load resistor 76, unless either one of the first and second output terminals 38, 40 rises in potential. If either of the latter terminals 38, 40 receives a positive pulse, the diode connected thereto conducts and the potential at the common output terminal 74 rises. Any suitable buffer circuit may be used to connect the first and second output terminals to the common output terminal. For example, the first and second output terminals may be connected to the grids of a pair of cathode coupled triodes (not shown) and the common output may be taken across the common cathode resistor of these triodes. Where several "either but not both" circuits are connected in cascade, as in a parity check application, the triode buffer arrangement may be preferred. With such an arrangement, each buffer pair of triodes may function as the input cathode follower of a succeeding "either but not both" circuit.

It is seen from the above description that if both of the input terminals 2, 4 remain at low potential, the output terminal 74 is at low potential. If both of the input terminals simultaneously rise in potential, there is, nevertheless, no change in potential at the output terminal. However, if one or the other of the input terminals receives a positive input pulse, a positive pulse is produced at the common output terminal. Thus, the logic of "either but not both" is produced.

The circuit has been described thus far as operating with voltage pulses. However, it should be noted that the circuit is direct-current connected, and therefore, it will operate equally well with static potential levels applied to the input terminals. Under such conditions, corresponding potential levels are produced at the output terminal in accordance with the logic of the circuit.

A circuit of this type is of general utility in information handling machines as a switching circuit. It may also be used in a binary adder and in a parity checker as described in the references cited above. A portion of the circuit described above also performs the logical function of "but-not." Consider the circuit made up of the first and second cathode followers 10, 12, the first inhibiting tube 34 and the first output terminal 38. A positive pulse is produced at the output terminal 38 if the first input terminal 2 is pulsed, but not if the second input terminal 4 is pulsed.

It may be noted that a circuit embodying this invention can be direct-current connected throughout. In this way, the problem of pulse repetition rate sensitivity may be avoided.

It is evident from the above description that a circuit embodying this invention produces the function of "either but not both" and is both simple and reliable in operation. Furthermore, it is economical in construction and finds widespread utility.

What is claimed is:

1. A signal responsive circuit comprising a first and second input terminal, a first and second output terminal, a first and second electron control device respectively connected between said first input and output terminals and said second input and output terminals and each responsive to signals applied to said input terminal connected thereto for producing signals at said output terminal connected thereto, first means coupled between said second control device and said first output terminal for inhibiting said signals at said first output terminal responsive to signals at said second input terminal, said first inhibiting means being connected in series with said first control device, second means coupled between said first control device and said second output terminal for inhibiting said -signals at said second output terminal responsive to signals at said first input terminal, said second inhibiting means being connected in series with said second control device, a common output terminal, and buffer means coupling said first and second output terminals to said common output terminal.

2. A signal responsive circuit as recited in claim 1 wherein said circuit is direct-current connected throughout.

3. A signal responsive circuit comprising a first and second electron control device each having a cathode and control electrode, a first and second input terminal respectively connected to the control electrodes of said first and second control devices for applying signals thereto, separate cathode resistors connected to said first and second control device cathodes, a first and second output terminal, separate resistors respectively connecting said first and second control device cathodes to said first and second output terminals, each of said cathode resistors being connected in parallel with said connecting resistor connected to the same cathode, and means coupled to said cathode electrodes of said first and second control devices and to said first and second output terminals for drawing current through said separate connecting resistors responsive to signals simultaneously applied to the control electrodes of said first and second control devices, a common output terminal, and buffer means coupling said first and second output terminals to said common output terminal.

4. A signal responsive circuit comprising a first, second, third and fourth electron control device each having an anode, cathode and control electrode, a first and second input terminal respectively connected to the control electrodes of said first and second control devices, a first output terminal connected to another one of said first control device electrodes and to one of said third control device electrodes other than the control electrode thereof, a second output terminal connected to another one of said second control device electrodes and to one of said fourth control device electrodes other than the control electrode thereof, means coupling one of said first control device electrodes other than the control electrode thereof to said control electrode of said fourth control device, means coupling one of said second control device electrodes other than the control electrode thereof to said control electrode of said third control device, the anode of one of said first and third control devices being connected to the cathode of the other, the anode of one of said second and fourth control devices being connected to the cathode of the other, a common output terminal, and buffer means coupling said first and second output terminals to said common output terminal.

5. A signal responsive circuit comprising a first, second, third and fourth electron control device each having an anode, cathode and control electrode, a first and second input terminal respectively connected to the control electrodes of said first and second control devices, a first and second output terminal, separate impedance means coupling another one of said first control device electrodes respectively to said first output terminal and to the control electrode of said fourth control device, separate impedance means coupling another one of said second control device electrodes respectively to said second output terminal and to the control electrode of said third control device, means coupling another one of said third control device electrodes to said first output terminal, and means coupling another one of said fourth control device electrodes to said second output terminal.

6. A signal responsive circuit comprising a first, second, third and fourth electron control device each having an anode, cathode and control electrode, a first and second input terminal respectively connected to the control electrodes of said first and second control devices, a first and second output terminal, separate means coupling one of said first control device anode and cathode electrodes to said first output terminal and to the control electrode of said fourth control device, separate means coupling one of said second control device anode and cathode electrodes to said second output terminal and to the control electrode of said third control device, means coupling one of said third control device anode and cathode electrodes to said first output terminal, means coupling one of said fourth control device anode and cathode electrodes to said second output terminal, a common output terminal, and buffer means coupling said first and second output terminals to said common output terminal.

7. A signal responsive circuit as recited in claim 6 wherein said one electrode of said first control device is said cathode thereof, and said one electrode of said second control device is said cathode thereof.

8. A signal responsive circuit as recited in claim 7 wherein said one electrode of said third control device is said anode thereof, and said one electrode of said fourth control device is said anode thereof.

9. A signal responsive circuit comprising a first, second, third and fourth electron discharge tube having an anode, cathode and control grid, separate cathode resistors connected to the cathodes of said first and second tubes, a first and second input terminal respectively connected to the control grids of said first and second tubes, separate resistors connecting said first tube cathode to said third tube anode and to said fourth tube control grid, separate resistors connecting said second tube cathode to said fourth tube anode and to said third tube control grid, separate grid resistors connected to said third and fourth tube control grids, means for applying an operating potential to said first and second tube anodes, an output terminal, and buffer means coupling said third and fourth tube anodes to said output terminal.

10. A signal responsive circuit comprising a first, second and third electron discharge tube each having an anode, cathode and control grid, separate cathode resistors connected to the cathodes of said first and second tubes, a first and second input terminal respectively connected to the control grids of said first and second tubes, a load resistor connecting said first tube cathode to said third tube anode to connect said first and third tube in series, said load resistor being connected in parallel with said first tube cathode resistor, a voltage divider connecting said second tube cathode to said third tube control grid, means for applying an operating potential to said first and second tube anodes, and an output terminal connected to said third tube anode.

References Cited in the file of this patent

UNITED STATES PATENTS

| | | |
|---|---|---|
| 2,497,965 | Usselman | Feb. 21, 1950 |
| 2,501,355 | Pratt | Mar. 21, 1950 |
| 2,506,770 | Braden | May 9, 1950 |
| 2,596,199 | Bennett | May 13, 1952 |

OTHER REFERENCES

Electronics, September 1948, "Digital Computer Switching Circuit," by Page, pp. 110–118.